Oct. 13, 1925.
M. A. C. JOHNSON ET AL
1,557,497
SHOCK ABSORBER
Filed Dec. 11, 1924
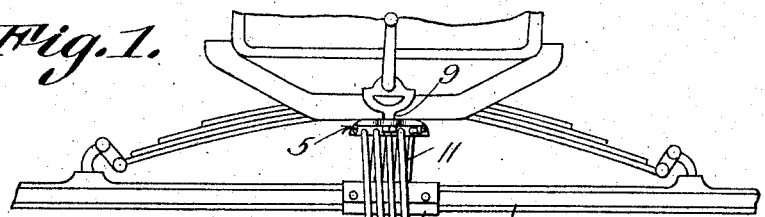
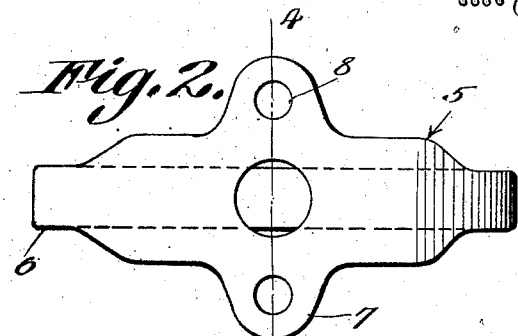
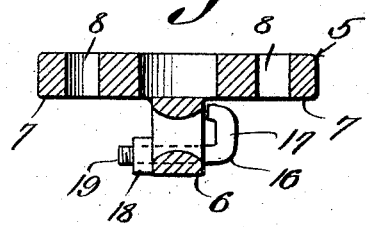
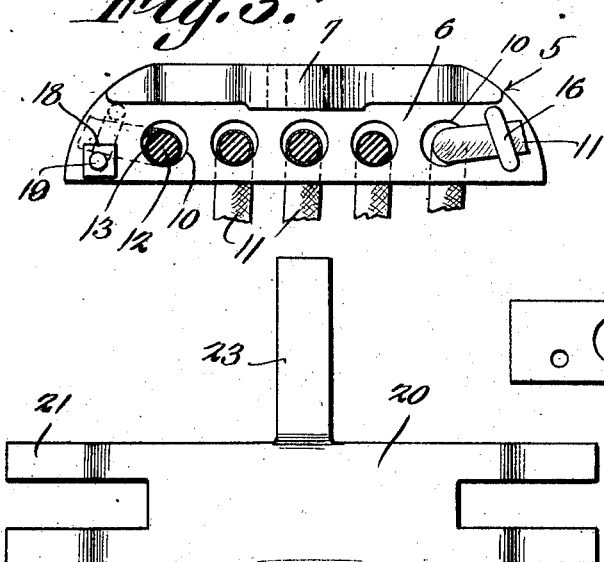
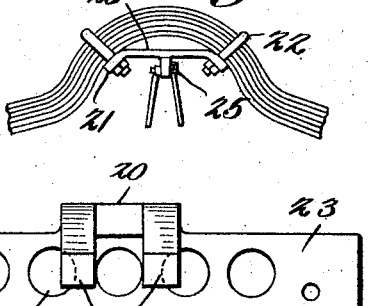
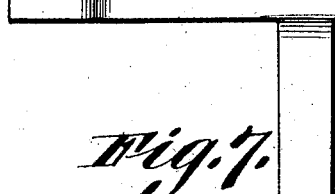
M.A.C. Johnson
H.C. Fisher
Inventors, Patented Oct. 13, 1925.

1,557,497

UNITED STATES PATENT OFFICE.

MYRON ABNER CAMERON JOHNSON AND HENRY COLEMAN FISHER, OF ASHEVILLE, NORTH CAROLINA.

SHOCK ABSORBER.

Application filed December 11, 1924. Serial No. 755,280.

*To all whom it may concern:*

Be it known that we, Lieutenant MYRON A. C. JOHNSON and HENRY C. FISHER, citizens of the United States, residing at Asheville, in the county of Buncombe and State of North Carolina, have invented a new and useful Shock Absorber, of which the following is a specification.

This invention relates to shock absorbers to be used in connection with motor vehicle structures, and aims to provide a shock absorber of a novel construction which may be readily and easily secured between the axles and body of a well known type of motor vehicle to cushion the rebound of the body portion and enhance the riding qualities of the vehicle.

An important object of the invention is to provide a device of this character which may be readily and easily adjusted, adapting the device for use in carrying loads of various weights.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view disclosing a shock absorber constructed in accordance with the invention as mounted on a motor vehicle construction.

Figure 2 is a plan view of the supporting member employed for securing the device in position.

Figure 3 is a side elevational view thereof illustrating the resilient member as positioned thereon.

Figure 4 is a sectional view taken on line 4—4 of Figure 2, the flexible member having been removed.

Figure 5 is an elevational view of a modified form of securing member used for securing the device to a rear spring construction.

Figure 6 is a side elevational view of the scoring member, and

Figure 7 is a plan view thereof.

Referring to the drawing in detail, the reference character 5 indicates a fastening member forming a part of the invention, which fastening member is formed with a central rib 6 and lateral flanges 7 disposed adjacent to the upper edge of the rim.

The lateral flanges 7 are formed with openings 8 through which the usual U-bolt 9, forming a part of the spring securing means, passes, to secure the fastening device to the body portion of the vehicle. As shown, the rib 6 is provided with a plurality of spaced openings indicated at 10 through which the resilient member, to be hereinafter more fully described, is laced to secure the resilient member thereto.

This resilient member which is indicated by the reference character 11 comprises a length of elastic material indicated at 12, encased in a suitable covering formed of suitable fibrous material and indicated at 13, the flexible member being shown as having portions thereof embracing portions of the axle 14 which, at its point of engagement with the flexible member is covered by a protecting member 15 which may be formed of leather or other suitable material to protect the flexible member from the sharp corners usually prevalent on motor vehicle axles.

The ends of the flexible member extend laterally as shown by Figure 3 of the drawing where they are embraced by means of the securing bolts 16 that pass through the rib 6 and have hook members 17 that are brought into close engagement with the right angled ends, by means of the nuts 18 that operate on the threaded portions 19 of the bolts.

Thus it will be seen that due to this construction, these nuts 18 may be loosened and the flexible member moved through the openings in such a way as to increase or decrease the tension of the flexible member, adapting the device for use in connection with loads of various weights.

Due to the construction of the rear spring of an automobile of a well known type, the fastening device to be employed in connection with the wheel spring is somewhat different from that shown by Figure 3 of the drawing and includes a body portion 20 having downwardly extended end portions 21 that are cut away to provide openings for the ends of the U-bolts 22, the downwardly extended end portions being constructed to conform to the shape of the rear spring.

Depending from the body portion 20 and formed integral therewith is a rib 23 which is formed with a plurality of spaced openings 24 through which the flexible member which is identical with that previously described, passes to secure the flexible member in position.

Similar fastening members indicated at 25 are employed for securing the ends of the flexible member in their positions of adjustments.

From the foregoing it will be obvious that due to this construction the resilient member will act to retard movement of the body with respect to the axles to relieve the usual springs of undue strain, and at the same time enhance the riding qualities of the vehicle.

It will also be noted that when the flexible member is worn beyond use, the same may be readily and easily replaced by persons unfamiliar with mechanics.

We claim:—

1. A shock absorber including a fastening member formed with a plurality of openings, an elastic member adapted to be extended through the openings of the fastening member and adapted to be looped around an axle of a vehicle supported thereunder, and means for securing the ends of the elastic member to the fastening member.

2. A shock absorber including a fastening member, said fastening member having openings, an elastic member adapted to extend through the openings, said elastic member adapted to embrace portions of an axle supported thereunder, and means for adjustably securing the ends of the elastic member to the fastening member.

3. A shock absorber including a fastening member, a rib forming a part of the fastening member and having openings arranged in parallel spaced relation with each other, an elastic member adapted to extend through the openings, said elastic member adapted to embrace portions of an axle supported thereunder, and means for securing the ends of the elastic member to the fastening member.

4. A shock absorber including a fastening member, said fastening member having lateral flanges formed with openings, a U-bolt adapted to extend through the openings to securing the fastening member to the body of a vehicle, an elastic member secured to the fastening member and adapted to be looped around an axle supported under the fastening member, and means for adjustably securing the elastic member to the fastening member.

In testimony that we claim the foregoing as our own, we have hereto affixed our signatures.

MYRON ABNER CAMERON JOHNSON.
HENRY COLEMAN FISHER.